H. L. JUDD.
Curtain-Hooks.
No. 139,676.  Patented June 10, 1873.
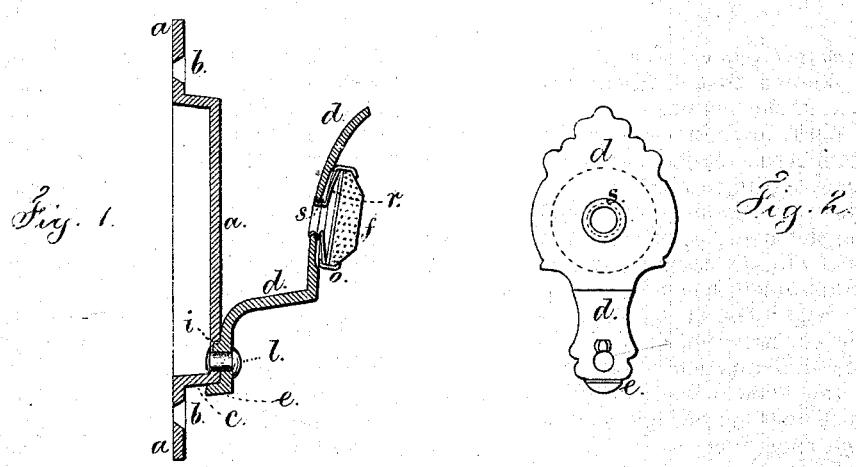

UNITED STATES PATENT OFFICE.

HUBERT L. JUDD, OF BROOKLYN, NEW YORK.

IMPROVEMENT IN CURTAIN-HOOKS.

Specification forming part of Letters Patent No. 139,676, dated June 10, 1873; application filed May 14, 1873.

*To all whom it may concern:*

Be it known that I, HUBERT L. JUDD, of Brooklyn, in the county of Kings and State of New York, have invented an Improvement in Curtain Arms or Hooks, of which the following is a specification:

This invention relates to the manner of constructing the metal arms or hooks that are employed for window-curtains, either to receive the curtain itself when drawn aside, or the cords by which the curtain is confined.

In the construction of these curtain arms or hooks difficulty has been experienced in uniting the hook to the plate in such a manner that it does not become loose or turn upon the connecting rivet.

I construct the lower end of the hook with a lip to set below the offset upon the plate, and with a teat to enter a recess in the plate, so that when the parts are united by a rivet they are immovable. The arm, or hook and plate, can be cast with facilty, with the projections and the holes so as not to require any separate finishing. I also employ an ornament at the end of the arm or hook, that is made of glass, porcelain, or other material, inclosed in a metal frame, and the sheet-metal back is united to the arm by a teat on the former passing through a hole in the latter, and being spread as an open rivet.

In the drawing, Figure 1 is a vertical section of the curtain-arm complete, and Fig. 2 is a rear view of the hook or arm separately.

The plate $a$ is of any usual size or shape and provided with the holes $b\ b$ for the attaching screws or pins, and at $c$ is an offset formed by the body of the plate being raised and the back thereof hollow. The arm or hook $d$ is of the desired size, and ornamental shape, and it is made with the lip $e$ to set below and against the offset $c$, and $i$ is a teat or projection upon the said hook $d$ that enters a similarly-shaped opening or recess in the surface of the plate $a$. The holes for the rivet $l$ are provided in the arm $d$ and plate $a$, respectively, and when this rivet is riveted up or clinched the parts are held firmly together, and the lip $e$ and teat $i$ effectually prevent the parts turning upon the rivet or working loose. The ornamental head $f$ is of glass or other suitable material, inclosed by a metal rim, $o$, and sheet-metal back $r$, similar to the head of a picture-nail, except that the sheet-metal back is made with a tubular projection or teat, $s$, to enter a hole through the arm $d$, and such hole should be countersunk in order that the end of the cylinder or teat, when spread for securing the ornamental head, may be below the surface of the hook at the back thereof.

I claim as my invention—

1. The lip $e$ and teat $i$ upon the arm $d$ in combination with the plate $a$, offset $c$, and rivet $l$, as and for the purposes set forth.

2. The curtain arm, hook, or band, made with an ornamental head attached by the sheet-metal back $r$ and cylinder or teat $s$, as and for the purposes set forth.

Signed by me this 8th day of May, A. D. 1873.

H. L. JUDD.

Witnesses:
GEO. T. PINCKNEY,
CHAS. H. SMITH.